United States Patent Office 3,732,230
Patented May 8, 1973

3,732,230
LIQUID PHASE POLYCHLORINATION OF PYRIDINE HYDROCHLORIDES
Thomas K. Brewer, El Sobrante, and Charles D. Crawford, Fullerton, Calif., assignors to The Dow Chemical Company, Midland, Mich.
No Drawing. Filed Dec. 7, 1970, Ser. No. 95,879
Int. Cl. C07d 31/26, 33/36
U.S. Cl. 260—283 R                        11 Claims

ABSTRACT OF THE DISCLOSURE

Polychlorinated derivatives of aromatic N-heterocyclic compounds are prepared by carrying out the chlorination step in a liquid phase operation while employing hydrogen chloride partial pressures of at least about 30 pounds per square inch gauge.

BACKGROUND OF THE INVENTION

Highly chlorinated aromatic N-heterocyclic compounds, especially those containing a pyridine nucleus, are known to be useful as pesticides or as intermediates for the preparation of other compounds having pesticidal properties. However, known methods of chlorination have provided such complex mixtures and low yields of the various components as to render such methods unsuitable as synthetic methods for the preparation of a particular component or group of components. To illustrate, chlorination of pyridine or methyl pyridines has been carried out in the presence of water whereby a spectrum of chlorination products have been obtained, none in significant amounts. Although certain of the components obtained by this method may be recovered by fractional distillation, the actual amount of any one or of even several of the components taken together has been so small as to render the method impractical for preparative purposes.

Another known procedure for chlorination of pyridine or methyl pyridines employs the step of saturating liquid pyridine or methyl pyridines with hydrogen chloride whereby a heterogeneous mixture containing solid hydrochlorides of pyridine or methyl pyridines is formed; and thereafter passing gaseous chlorine through the mixture for an extended period of time to effect a reaction as evidenced by the disappearance of the solid and formation of a relatively homogeneous mixture. This process produces a wide range of chlorinated products and a great deal of tarry materials and although some of the components are recoverable by fractional distillation, the amount of any particular product or group of products generally is small. Thus, these above methods are not employable for the production of selected chlorinated pyridine products.

Another method of preparing polychlorinated pyridines is taught in U.S. Patent 3,256,157 wherein alpha-methyl pyridine is reacted at atmospheric pressure with hydrogen chloride at a temperature of from about 20° to about 70° C. to prepare a liquid alpha-methyl pyridine hyydrochloride composition which is reacted with gaseous chlorine in the absence of added water at a temperature of from 95°–120° C. and at ambient atmospheric pressure. This patent also teaches the use of actinic radiation and/or a Lewis acid catalyst to obtain yields of about 30 mole percent of 3,4,5,6 - tetrachloro-2-(trichloromethyl)pyridine. While this process has enjoyed somewhat more success than other prior art processes, it is not entirely satisfactory and new and improved processes are continually being sought which are more economical and which will give higher yields of higher polychlorinated compounds and reduced co-production of tar components.

SUMMARY OF THE INVENTION

This invention relates to an improved process for preparing polychlorinated aromatic N-heterocyclic compounds. It has now been found that polychlorinated aromatic N-heterocyclic compounds can be produced in high yields by contacting, in the liquid phase, a liquid composition of an unchlorinated aromatic N-heterocyclic compound as a hydrochloride with chlorine gas at a temperature of from about 80° C. to about 225° C. under a hydrogen chloride partial pressure of at least about 30 pounds per square inch gauge (p.s.i.g.), said hydrogen chloride partial presure being sufficient to maintain the molar proportions of hydrogen chloride:aromatic N-heterocyclic compound in said liquid composition of from about 1.9:1 to about 10:1, usually from about 1.9:1 to about 4:1.

By "liquid aromatic N-heterocyclic hydrochloride composition" is meant a substantially homogeneous liquid mixture or solution having a molar proportion of hydrogen chloride to aromatic N-heterocyclic compound of at least 1.9:1, which results when an aromatic N-heterocyclic is contacted with hydrogen chloride at a temperature of from about 25° to about 200° C. at a hydrogen chloride partial pressure of from about 30 p.s.i.g. up to the critical pressure of hydrogen chloride.

The present process has been found to be generally operable in preparing polychlorinated aromatic N-heterocyclics from quinolines, pyridine and methyl pyridines. It is particularly suited for preparing polychlorinated pyridines and methyl pyridines in good yields with minimal production of tar components including dimers.

The critical features of this process are in the use of a hydrogen chloride partial pressure of at least 30 pounds per square inch gauge and in maintaining the molar proportion of hydrogen chloride:aromatic N-heterocyclic compound in the liquid composition at a level of at least 1.9:1. It has been found that by carrying out the present improved process under these conditions, an increase in the yield of the highly chlorinated compounds occurs over that realized from conventional processes employed heretofore.

The term "methyl pyridine" as employed in the present specification and claims designates methyl substituted pyridines such as, for example, 2-methyl pyridine (α-picoline), 4-methyl pyridine (γ-picoline), 2,4-dimethyl pyridine (2,4-lutidine), 2,6-dimethyl pyridine (2,6-lutidine), 3,5-dimethyl pyridine (3,5-lutidine) and 2,4,6-trimethyl pyridine (2,4,6-collidine).

By carrying out the process of the present invention employing pyridine itself as the starting material, a product composition is obtained which is enriched in 2,3,4,5-tetrachloropyridine and other polychloropyridines; when alpha-methyl pyridine is employed as the starting material, a composition enriched in 3,4,5,6-tetrachloro-2-(trichloromethyl)pyridine is obtained; and when gamma-methyl pyridine is employed as the starting material, a composition enriched in 2,3,5,6-tetrachloro-4-(trichloromethyl)pyridine is obtained. The present process is adapted to batch, cyclic batch and continuous operations.

Ordinarily, in the practice of the present process, a liquid aromatic N-heterocyclic hydrochloride composition is first prepared under controlled temperature and pressure conditions. This composition is thereafter contacted in a liquid phase system with gaseous chlorine, under controlled conditions of temperature and pressure, to produce the desired polychloro aromatic N-heterocyclic product.

The hydrochlorination step is initiated by contacting an aromatic N-heterocyclic compound starting material with a hydrogen chloride source material, such as, for example, hydrogen chloride or a hydrogen chloride-chlorine off-gas mixture recycled from the chlorination stage, or from another chlorination process, at a temperature in the range of about 25° to about 225° C. at a hydrogen chloride partial pressure of from about 30 p.s.i.g. up to the critical pressure of hydrogen chloride. The preferred temperature range for hydrochlorination depends on the aromatic N-heterocyclic compound being contacted; to illustrate, temperatures of from about 120° to about 150° C. usualy are employed for pyridine and from about 25° to about 160° C. for the methyl substituted pyridines and quinolines.

It is essential that the aromatic N-heterocyclic compound starting material be usbstantially water-free, i.e., have a water content of no more than 5 percent by weight, preferably less than 0.1 percent by weight. The hydrogen chloride-chlorine gas mixture also should be substantially free of any chlorinate aromatic N-heterocyclics as these compounds will from tars with the unprotonated aromatic N-heterocyclic compounds used as starting materials. Any such chlorinated compounds, which may be present when the off-gases from a chlorinator are employed as the hydrogen chloride-chlorine gas source for the hydrochlorinator, can easily be removed therefrom by a conventional countercurrent washing with the aromatic N-heterocyclic hydrochlorides from the hydrochlorinator. In some instances, it is desirable to employ a diluent. Suitable diluents are halogenated hydrocarbons, such as, for example, trichloromethane and carbon tetrachloride.

In actually carrying out the hydrochlorination reaction, the contacting of the heterocyclic compound and the hydrogen chloride generally is initiated at ambient temperature and the exothermic heat of reaction is allowed to raise the temperature to a maximum of about 200° C., depending on the specific material being employed. Higher temperatures may result in undersirable tar formation. As the molar proportion of hydrogen chloride is increased, the temperature is allowed to rise sufficiently to avoid solidification. The remainder of the hydrogen chloride is added at a rate which avoids tarring. An efficient means in continuous operations for preparing the hydrochlorides added after chlorination of the starting charge is under way, comprises contacting the hydrogen chloride-chlorine mixture off-gas from the chlorination unit and the aromatic N-heterocyclic compound in a countercurrent flow relationship under a hydrogen chloride partial pressure of at least 30 p.s.i.g. The smooth conduction of the resulting material to the chlorination reactor readily is achieved by downflow of the resulting liquid reaction mixture.

To prepare the desired polychlorinated aromatic N-heterocyclic products, a heterocyclic compound hydrochloride having a molar proportion of hydrogen chloride: heterocyclic compound of about 1.9:1 to about 10:1 prepared as described directly hereinbefore or from an independent source is contacted with chlorine gas at a temperature in the range of 80° to 225° C. at a hydrogen chloride partial pressure of between 30 p.s.i.g. and the critical pressure of the hydrogen chloride-chlorine mixture.

It is essential that significantly higher temperatures be avoided in order that undesirable by-product formation or mechanical difficulties resulting from such by-product formation be prevented. The preferred reaction conditions include a temperature range of 125° to 175° C. when the feed is pyridine and 85° to 120° C. when the feed is a methyl pyridine.

As indicated hereinabove, pressure is a critical parameter of this invention. In carrying out the process, total pressures of from 50 to about 200 p.s.i.g. are preferred. The hydrogen chloride partial pressure should be maintained at at least 30 p.s.i.g. As hydrogen chloride partial pressure is increased, the amount of higher polychlorinated products increases but there is essentially no increase in the amount of dimer produced.

The partial pressure of the chlorine in the reactor during the chlorination is generally kept high enough to ensure that the reaction rate is not limited by chlorine availability. As a general rule and over the entire operable range of pressures, undesired side reactions are favored by increases in the chlorine pressure. The lower the partial pressure of chlorine, the more essential it is to have good agitation to ensure maximum contact between the liquid mass and gaseous chlorine.

In the case of pyridine chlorination by the instant process, for example, a chlorine partial pressure of about 8 to 10 p.s.i.g. has been found adequate—with proper agitation—to ensure that the pyridine/hydrogen chloride composition is nearly saturated with chlorine. At a chlorine partial pressure of only 4 p.s.i.g., the reaction rate is approximately halved. At partial pressures substantially above 10 p.s.i.g., dimer formation increases significantly.

With alpha-picoline, for example, high yields of the desired polychlorinated products with minimum tar formation have been realized with a reaction temperature of 95° C., a total pressure of 150 p.s.i.g. and chlorine partial pressures of from about 15 p.s.i.g. up to about 60 p.s.i.g.

The exact rate and mode of introduced of chlorine gas into the chlorination reactor depends on the particular size of the operation, shape of the reactor and whether or not mechanical mixing or other means of agitation is employed.

In preferred operations, the chlorine gas is introduced by either sparging it into the reactor in admixture with at least an equal volume of hydrogen chloride or by adding the chlorine gas to the vapor space in the reactor above the aromatic heterocyclic feed:hydrogen chloride composition wherein it is absorbed into the composition. By employing either of the above modes of introduction, the heterocyclic reactant is prevented from contacting undiluted chlorine gas whereby higher yields of the desired product are obtained with less dimer formation.

The process can be carried out using from about a stiochiometric quantity of chlorine gas to produce a predetermined polychloro substituted aromatic heterocyclic up to about 400 percent of stiochiometric. The preferred amount of excess chlorine depends on the particular compound being chlorinated and on the specific product desired. For instance, to produce 2,3,4,5-tetrachloropyridine from pyridine, a low excess of chlorine of about 5 to 10 percent over stiochiometric is employed to minimize the formation of dimers; however, to obtain high yields of heptachloro-alpha-picoline from alpha-picoline, a large excess of chlorine is necessary, such as, for example, 400 percent over stiochiometric. The amount of excess chlorine will, of course, have an effect on the reaction rate, but such effect is usually of secondary importance.

The temperature is the most important variable. Changes in the reaction temperature during chlorination results primarily in changes in the composition of the desired product. At lower temperatures, such as, for example, from 80 to 150° C. when employing pyridine as the feed, pentachloropyridine accounts for between about 30 to about 50 percent of the product, lower chlorinated materials such as the trichloropyridines are obtained in amounts of about 1 percent, symmetrical tetrachloropyridine ranges between about 2 and about 4 percent, 2,3,4-tetrachloropyridine accounts for between about 40 and about 50 percent of the product while dimer formation is held to about 10 to 15 percent. As the temperature rises to about 170°–180° C. or above, the symmetrical tetrachloropyridine content rises to about 7 to 8 percent, the 2,3,4,5-tetrachloropyridine content goes to about 60 percent and the dimer content drops to about 5 percent of the product. The relative concentrations of trichloro- and pentachloropyridines are reversed, i.e., the pentacholropyridines drop to about 3 to 5 percent while the trichloropyridines increase to about 25 to 30 percent.

Conveniently, the rate of chlorine introduction into the chlorination reactor is based on the rate of introduction of the aromatic N-heterocyclic reactant into the reaction system. This rate can be expressed as the weight ratio of chlorine to aromatic N-heterocyclic compound. Usually this ratio ranges from about 3.6:1 to about 5.0:1. Illustrative of a desirable rate is that of from about 18 to 22 pounds of chlorine per hour at an aromatic N-heterocyclic feed rate of 4.5 to 5.5 pounds per hour (i.e., a weight ratio of 4 to 1) introduced into a 100-gallon reactor containing about 70 gallons of liquid reaction mixture. The residence time in the reactor is dependent on the volume of reaction mixture and aromatic N-heterocyclic feed rate necessary to hold a steady state. By "steady state" is meant the condition attained when the reaction mixture composition and the volume of the reaction mixture is no longer changing significantly. The actual time necessary to achieve a steady state in a given operation will depend on reaction conditions applied to the system and is readily determined by those who are skilled in the art. It is to be noted that as the operation continues and the reaction approaches a steady state, a dual liquid phase system of substantially definite proportions develops. The upper liquid phase is a liquid hydrochloride composition comprising unreacted aromatic N-heterocyclic compound hydrochloride and lower chlorinated products and the lower liquid phase comprises the highly chlorinated aromatic N-heterocyclic products and trace amounts of hydrogen chloride.

The portion of the reaction mixture enriched in the polychlorinated product is usually pale yellow in color, has a substantially constant density, contains only minor proportions of lower chlorinated compounds and is substantially free of hydrogen chloride. The product may be removed from the reaction zone by conventional methods and may be separated into its components, if desired, by fractional distillation or other conventional separation operations or it may be employed as it comes from the reactor. It is also possible to separate the lower chlorinated aromatic N-heterocyclic compounds and recycle them to the chlorination reaction zone for further chlorination.

It is not a requirement of this process that the liquid hydrochloride reactant be made by reacting the feed compound with the hydrogen chloride in the off-gas from the chlorination unit, or if off-gas is employed that the contacting must be in countercurrent flow. A batch operation using conventional procedures can be employed. The hydrochloride may be made by any process which insures the preparation of a hydrochloride having a molar proportion of hydrogen chloride:aromatic N-heterocyclic of from 1.9:1 to about 4:1 or higher. Once prepared, the hydrochloride should, however, be retained under sufficient hydrogen chloride pressure to maintain the hereinabove specified molar proportion of hydrogen chloride to aromatic N-heterocyclic compound.

From the economical standpoint and to assure the maximum in ease of operation, it is desirable to employ the off-gases from the chlorinator to convert the feed compound to the corresponding hydrochloride. By contacting the feed compound in countercurrent flow to the off-gases, the resulting hydrochloride helps to scrub out any vaporized or entrained chlorinated product in the off-gas from the chlorinator. This latter step is important since it lessens the chance of contact between any chlorinated products and the unmodified feed compound as a free base. It is also very desirable to carry out this step at the same pressure as employed in the chlorination step.

DESCRIPTION OF SOME PREFERRED EMBODIMENTS

The present invention is described more fully by the following examples. However, these examples are not to be construed as limitations upon the overall scope of the present invention.

Example I

A batch operation is carried out by charging 5 gallons (0.534 pound mole) of pyridine into a 20-gallon glass-lined Pfaudler vessel having a stirrer and a steam jacket and the vessel is sealed. Hydrogen chloride gas is sparged into the agitated pyridine charge and the temperature of the mixture is allowed to rise to a maximum of about 120° C. and held at this temperature until about 15 pounds of hydrogen chloride has been added. The rate of hydrogen chloride gas addition is increased and the temperature is allowed to rise to about 175° C. Steam is introduced into the steam jacket to maintain the temperaure at about 175° C., the hydrogen chloride pressure is allowed to increase to 80 pounds per square inch gauge and hydrogen chloride gas introduction is stopped. Gaseous chlorine addition is started and continuously sparged at a rate of 4 pounds per hour into the liquid pyridine hydrochloride composition reaction mixture for 8 hours after which the chlorine addition and the agitation is stopped and the reaction mixture allowed to settle for about 5 minutes whereupon two substantially immiscible phases separate. During the gaseous chlorine addition, a pressure controlled vent valve in the reaction vessel maintains the total pressure (i.e., combined hydrogen chloride and chlorine pressure) at 80 p.s.i.g. by releasing the hydrogen chloride formed in the reaction along with any excess chlorine gas present. The hydrogen chloride partial pressure is about 76 p.s.i.g.

Six and a half pounds of the heavier phase is removed and analyzed by vapor phase chromatographic analysis techniques. The analysis shows this phase to contain predominant amounts of 2,3,4,5-tetrachloropyridine (45.90 mole percent), 2,3,5- and 3,4,5-trichloropyridines (39.60 mole percent) and about equal amounts of 3,5-dichloropyridine and dimer.

The lighter phase is also sampled and analyzed by vapor phase chromatographic analysis techniques; the analysis shows this phase to contain a predominant amount of unreacted pyridine hydrochloride composition and minor amounts of various chlorinated pyridines.

The chlorination is resumed and the reaction stopped every 4 hours over the next 18 hours to remove the heavy phase present for a total accumulation of 43.7 pounds of heavy phase. This heavy phase is analyzed and is found to contain predominant amounts of 2,3,4,5-tetrachloropyridine (48.0 mole percent) and 2,3,5- and 3,4,5-trichloropyridine (37.0 mole percent), 2,3,5,6-tetrachloropyridine (4.0 mole percent), 3,5-dichloropyridine (3.3 mole percent), pentachloropyridine (1.7 mole percent) and dimers (6 mole percent).

Example II

A series of additional runs are made employing the method of Example I. In these runs, the effect of time, temperature and reactor pressures are studied; and in each, the hydrogen chloride partial pressure is at least 80 percent of the total pressure. The results of these runs are given in Table A.

TABLE A

| Run No. | Hours run before sample | Sum of chlorine and hydrogen chloride partial pressures in p.s.i.g. | Temp., °C. | Percent pyridine converted | Mole percent of predominant components of pyridine-free heavy phase product composition [1] | | | |
|---|---|---|---|---|---|---|---|---|
| | | | | | 3,5-dichloro-pyridine | 3,4,5- and 2,3,5-trichlo-ropyridine | 2,3,4,5-tetra-[2] and 2,3,5,6-tetra-chloropyridine | Penta-chloro-pyridine |
| 2 | 6 | 40 | 174 | 44.3 | 10.0 | 32.9 | 31.4 | 0.3 |
| 3 | 11 | 80 | 172 | 45.6 | 8.7 | 32.5 | 44.2 | 0.9 |
| 4 | 8 | 80 | 174 | 35.7 | 7.5 | 38.4 | 35.3 | 1.8 |
| 5 | 8 | 80 | 174 | 40.4 | 8.8 | 32.2 | 31.2 | 0.8 |
| 6 | 10 | 120 | 172 | 34.0 | 9.8 | 24.1 | 42.9 | 4.0 |
| 7 | 6 | 120 | 174 | 35.2 | 9.2 | 27.1 | 38.0 | 1.6 |

[1] Remaining components consisting essentially of 3-chloropyridine and the dimer.
[2] Mixture consists predominantly of 2,3,4,5-tetrachloropyridine isomer.

Example III

Another series of two runs following the procedure of Example I are made at a temperature of 150° C. employing reactor pressures of 80 p.s.i.g. and 120 p.s.i.g. The hydrogen chloride partial pressure is at least 80 percent of the total pressure The results of these studies are summarized below in Table B.

Example V

An additional run (run 16) is carried out in a manner substantially as described in Example I, except that the feed is gamma-picoline (4-methylpyridine), the reactor pressure is 100 p.s.i.g., the hydrogen chloride partial pressure is at least 80 percent of the total pressure and the temperature is 95° C. The results of this run are summarized below in Table D in mole percent of components in gamma-picoline-free heavy phase products.

TABLE B

| Run No. | Hours run before sample | Sum of chlorine and hydrogen chloride partial pressures in p.s.i.g. | Temp., °C. | Percent pyridine converted | Mole percent of predominant components of pyridine-free heavy phase product composition [1] | | | |
|---|---|---|---|---|---|---|---|---|
| | | | | | 3,5-dichloro-pyridine | 3,4,5- and 2,3,5-trichlo-ropyridine | 2,3,4,5-tetra-[2] and 2,3,5,6-tetra-chloropyridine | Penta-chloro-pyridine |
| 8 | 14 | 80 | 150 | 24.0 | 8.5 | 6.1 | 37.8 | 23.8 |
| 9 | 12 | 120 | 150 | 40.8 | 5.4 | 7.1 | 43.3 | 21.8 |

[1] Remaining components consisting essentially of dimer and monochloropyridine.
[2] Mixture consists predominantly of 2,3,4,5-tetrachloropyridine isomer.

Example IV

A series of runs are carried out in a manner substantially as described in Example I, except that the feed is alpha-picoline (2-methylpyridine). The conditions of temperature and reactor pressures are varied in each run. The hydrogen chloride partial pressure is at least 80 percent of the total pressure. The results are summarized below in Table C. For ease in tabulation, the following compound designations are used:

alpha-hepta designates 3,4,5,6-tetrachloro-2-(trichloromethyl)pyridine
alpha-3,4,5-hex. designates 3,4,5-trichloro-2-(trichloromethyl)pyridine
alpha-2,3,5-hex. designates 3,5,6-trichloro-2-(trichloromethyl)pyridine
alpha-3,5-penta designates 3,5-dichloropyridine-2-(trichloromethyl)pyridine
alpha-tetra designates 5-chloro-2-(trichloromethyl)pyridine

TABLE D

| Component: | Mole percent |
|---|---|
| 2,3,5,6-tetrachloro-4-(trichloromethyl)pyridine | 40.0 |
| 2,3,5-trichloro-4-(trichloromethyl)pyridine | 14.1 |
| 2,3,6-trichloro-4-(trichloromethyl)pyridine | 9.0 |
| Dichloro-4-(trichloromethyl)pyridine (all 4 isomers) | 35.0 |
| Chloro-4-(trichloromethyl)pyridine (both isomers) | 1.5 |

Example VI

A series of additional runs are carried out in a manner substantially as described in Example I, except that the temperature and reactor pressures are varied in each run and the feed is alpha-methyl pyridine. The hydrogen chloride partial pressure is at least 20 percent of the total pressure. The results are summarized below in Table E wherein the compound designations used are the same as set forth in Example IV.

TABLE C

| Run No. | Sum of chlorine and HCl partial pressures, p.s.i.g. | Temp., °C. | Mole percent of components of alpha-picoline-free heavy phase product | | | | |
|---|---|---|---|---|---|---|---|
| | | | Alpha-hepta | Alpha-3,4,5-hex. | Alpha-2,3,5-hex. | Alpha-3,5-penta | Alpha-tetra |
| 10 | 45 | 105 | 55.4 | 31.4 | 1.0 | 11.2 | 1.0 |
| 11 | 80 | 105 | 65.1 | 26.5 | 0.6 | 7.3 | 0.5 |
| 12 | 45 | 85 | 63.6 | 26.5 | 1.0 | 8.2 | 0.7 |
| 13 | 45 | 95 | 62.3 | 25.9 | 0.7 | 10.0 | 1.1 |
| 14 | 80 | 95 | 73.5 | 20.6 | 0.6 | 5.0 | 0.3 |
| 15 | 100 | 95 | 80.2 | 16.4 | 0.2 | 2.8 | 0.4 |

TABLE E

| Run No. | Sum of chlorine and hydrogen chloride partial pressures, p.s.i.g. | Temp., °C. | Mole percent of components of alpha-picoline-free heavy phase product | | | |
|---|---|---|---|---|---|---|
| | | | Alpha-hepta | Alpha-2,3,5-hex. and alpha-3,4,5-hex. | Alpha-3,5-penta | Undetermined |
| 17 | +45 | 85 | 65.6 | 26.0 | 7.3 | 1.1 |
| 18 | +45 | 95 | 68.5 | 24.0 | 6.6 | 0.9 |
| 19 | 80 | 95 | 79.0 | 17.3 | 3.3 | 0.4 |
| 20 | 80 | 105 | 68.2 | 24.9 | 6.1 | 0.8 |
| 21 | 100 | 95 | 82.6 | 15.2 | 2.1 | +0.1 |
| 22 | 120 | 85 | 71.5 | 23.0 | 5.1 | 0.4 |
| 23* | 150 | 95 | 88.0 | 8.5 | 3.5 | |
| 24* | 200 | 95 | 88.5 | 7.5 | 4.0 | |
| 25* | 250 | 95 | 90.0 | 7.0 | 3.0 | |

*In these runs, the hydrogen chloride partial pressure is at least 30 p.s.i.g.

Example VII

An additional run (run 26) is carried out in a manner substantially as described in Example I except that the feed is 2,4-lutidine(2,4-dimethylpyridine), the reactor pressure is 200 p.s.i.g., the hydrogen chloride partial pressure is at least 160 p.s.i.g., and the temperature is 100° C. The results of this run are summarized below in Table F in mole percent of the components in the heavy phase products.

TABLE F

| Components: | Mole percent |
|---|---|
| Mixture of all compounds containing 4, 5 and 6 chlorine atoms | 69 |
| Mixture of all compounds containing 7 chlorine atoms | 19 |
| Mixture of all compounds containing 8 chlorine atoms | 8 |
| Perchlorinated 2,4-lutidine | 4 |

Example VIII

A series of additional runs are carried out in a manner substantially as described in Example I, except that the feed is 2,6-lutidine (2,6-dimethylpyridine). The conditions of temperature and reactor pressures are varied in each run. The hydrogen chloride partial pressure is at least 80 percent of the total pressure. The results are summarized below in Table G in mole percent of the components in the heavy phase products.

TABLE G

| Run No. | Temp., °C. | Sum of chlorine and hydrogen chloride partial pressures, p.s.i.g. | Mole percent of components in heavy phase products | | | |
|---|---|---|---|---|---|---|
| | | | Cl₆'s[1] | Cl₇'s[2] | Cl₈'s[3] | Perchloro 2,6-lutidine |
| 27 | 85 | 100 | | [4]58.6 | 37.3 | 4.1 |
| 28 | 105 | 100 | | 43.1 | 49.2 | 7.7 |
| 29 | 100 | 200 | 43.0 | 28.0 | 15.0 | [5]12.0 |
| 30 | 125 | 200 | 56.0 | 28.0 | 11.0 | [5]3.0 |

[1] Mixture of all compounds containing 6 chlorine atoms; mixture is predominantly 2,6-di(trichloromethyl)pyridine.
[2] Mixture of all compounds cnotaining 7 chlorine atoms; mixture is predominantly 2,6-di(trichloromethyl)-3-chloropyridine and some 2,6-di(dichloromethyl)-3,4,5-trichloropyridine.
[3] Mixture of all compounds containing 8 chlorine atoms; mixture is predominantly 2-trichloromethyl-6-dichloromethyl-3,4,5-trichloropyridine.
[4] Percentage given is total for mixture of compounds containing 6 and 7 chlorine atoms.
[5] Remaining product unidentified.

Example IX

A series of additional runs are carried out in a manner substantially as described in Example I, except that the feed is 3,5-lutidine (3,5-dimethylpyridine). These runs are carried out employing carbon tetrachloride as a diluent present in an amount equal to 60 volume percent of the total liquid charge. The reactor pressure is 200 p.s.i.g., the hydrogen chloride partial pressure is at least 65 percent of the total pressure, and the temperature is varied in each run. The results are summarized below in Table H in mole percent of the components in the heavy phase products.

TABLE H

| Run No. | Temp., °C. | Sum of chlorine and hydrogen chloride partial pressures, p.s.i.g. | Mole percent of components in heavy phase products | | | | |
|---|---|---|---|---|---|---|---|
| | | | Cl₆'s[1] | Cl₇'s[2] | Cl₈'s[3] | Perchloro 3,5-lutidine | Unidentified |
| 31 | 100 | 200 | 20 | 53 | 16 | 6 | 5 |
| 32 | 120 | 200 | 11 | 53 | 22 | 10 | 4 |

[1] Mixture of all compounds containing 6 chlorine atoms.
[2] Mixture of all compounds containing 7 chlorine atoms.
[3] Mixture of all compounds containing 8 chlorine atoms.

Example X

An additional run (run 33) is carried out in a manner substantially as described in Example I, except that the feed is 2,4,6-collidine (2,4,6-trimethylpyridine). This run is carried out employing carbon tetrachloride as a diluent present in an amount equal to 60 volume percent of the total liquid charge. The temperature is 100° C. and the reactor pressure is 200 p.s.i.g. The hydrogen chloride partial pressure is at least 75 p.s.i.g. The results of this run are summarized below in Table I in mole percent of the components in the heavy phase products.

TABLE I

| Components: | Mole percent |
|---|---|
| Mixture of all compounds containing 4 chlorine atoms | 57.0 |
| Mixture of all compounds containing 5 and 6 chlorine atoms | 21.0 |
| Mixture of all compounds containing 7 chlorine atoms | 7.0 |
| Perchlorinated 2,4,6-collidine | 1.5 |
| Unidentified | 13.5 |

Example XI

A continuous operation (run 34) is carried out by pumping 3.7 liters (45.8 gram moles) of pyridine into a 200 cubic centimeter glass column chlorinator packed with ⅛ inch glass helices. The pyridine is circulated through the column at a rate of 2 gallons per minute and heated to 60° C. by external electric heating tapes on the column. The heating is terminated and hydrogen chloride is sparged into the circulating pyridine at ~1 gram mole per minute and the temperature is allowed to rise to ~150° C. over a 75-minute period. Hydrogen chloride addition is continued for an additional 50 minutes to bring the hydrogen chloride partial pressure to 30 p.s.i.g., the temperature to 133° C. and saturate the pyridine with hydrogen chloride. Chlorine gas is sparged into the system at a rate of 9 g.p.m. for a period of 16 hours while the circulation rate is maintained at 2 g.p.m. A heavy phase is formed after about 8 hours of chlorine In run 37, the chlorine is introduced only into the gas phase, to maintain the chlorine concentration in the reactor off-gas at a level of about 12.5 mole percent. Both runs are carried out at a total pressure of 80 p.s.i.g. The content of pyridine in the light phase and the composition of the heavy product phase after substantially "steady state" conditions are attained are set forth below in Table K.

TABLE K

| Run No. | Hydrogen chloride partial pressure (p.s.i.g.) | Temp., °C. | Mole percent pyridine in light phase | Mole percent of components in heavy phase products | | | | | |
|---|---|---|---|---|---|---|---|---|---|
| | | | | Dichloro pyridines | Trichloro pyridine | 2,3,4,5-tetrachloro pyridine | 2,3,5,6-tetrachloro pyridine | Pentachloro pyridine | Dimer |
| 36 a | ~60 | 160 | 35 | 1.0 | 26 | 60 | 6.0 | 2.4 | 5 |
| 37 b | ~70 | 160 | 31 | 0.4 | 17 | 64 | 9.7 | 6.0 | 3.6 | a Chlorine sparged into liquid phase as equimolar mixture with HCl.
b Chlorine introduced into vapor phase only.

gas addition and is drained off at ~2-hour intervals over an 8-hour period to collect a total of 1011 grams. Fresh pyridine is pumped into the system to maintain the reactor at constant volume. The heavy phase collected is analyzed by vapor phase chromatographic analysis techniques and the analysis shows this phase to contain 1.8 weight percent of a mixture of 2,3,5- and 3,4,5-trichloropyridine, 52 weight percent of a mixture of 2,3,4,5- and 2,3,5,6-tetrachloropyridine, 33 weight percent of pentachloropyridine, 12 weight percent dimer and 1.2 weight percent unidentified.

Example XII

An additional run (run 35) is carried out by charging a Pfaudler reactor with 500 milliliters of carbon tetrachloride and 129 grams (1 gram mole) of quinoline. Hydrogen chlorine gas is metered into the reactor at a rate equal to 4.6 gram moles per hour for 1⅓ hours and the temperature allowed to rise to 37° C. and the reactor pressure to 273 p.s.i.g. Thereafter, the reaction mixture is maintained under these conditions of temperature and pressure for ~19½ hours. The temperature is thereafter raised to 100° C. and the pressure increases to 300 p.s.i.g. Chlorine is metered into the system at a rate equal to 0.7 gram mole per hour for a total of ~15 hours, while venting throughout the reaction as necessary to maintain the reactor pressure at ~300 p.s.i.g., for a total input of 10.3 gram moles. The reactor is cooled, vented and drained. The heavy phase is analyzed by vapor phase chromatographic analysis techniques and the results of this analysis are set forth below in Table J as the mole percent of the components of the heavy phase products. The results also set forth a comparison with the mole percent of the components of an intermediate heavy phase collected after ~3.5 gram moles of chlorine is metered into the system.

TABLE J

| Component | Mole percent | |
|---|---|---|
| | Intermediate heavy phase | Final heavy phase |
| Unidentified lower chlorinated quinolines | 15.0 | 8.0 |
| 3,4,6,8-tetrachloroquinoline | 19.0 | .6 |
| Unidentified compounds containing 4 and 5 chlorine atoms | 6.0 | 3.7 |
| 3,4,5,6,8-pentachloroquinoline | 20.4 | 4.5 |
| 3,4,6,7,8-pentachloro quinoline | 23.9 | 21.3 |
| 3,4,5,6,7,8-hexachloroquinoline | 8.9 | 29.5 |
| Heptachloro quinoline | 6.5 | 32.4 |
| Unidentified | .3 | |

Example XIII

An additional set of two runs (36 and 37) illustrating preferred embodiments are carried out in a manner substantially as described in Example I except for the manner of chlorine introduction to the reaction zone. In run 36, the chlorine is mixed in a 1:1 mole ratio with hydrogen chloride before being sparged into the liquid phase.

Example XIV

An additional run (run 38) is carried out in the manner of run 36 (Example XIII) but on a larger scale and is continued for 450 hours.

Twenty gallons of pyridine are charged to a 100 gallon, glass lined Pfaudler reactor. The reactor jacket is filled with water (room temperature) and the overflow valve on the jacket left open. The pyridine is maintained under agitation and 80 lbs. of hydrogen chloride is throttled in, raising the temperature of the reactor contents to about 120° C. More rapid introduction of another 100 lbs. of hydrogen chloride raises the temperature to 170° C. and a pressure of 150 p.s.i.g. is established 8 hours after hydrogen chloride introduction is started.

The water in the jacket is replaced with steam to maintain temperature and metering of chlorine gas into the vapor space in the reactor at a rate of 11 lbs./hr. is started. Simultaneously, introduction of about 3 lbs./hr. of a "recycle" stream consisting of a previously obtained trichloropyridine distillation cut (mostly the 2,3,5-isomer) is started. At this time, there is also initiated introduction of pyridine at a rate of about 6.6 lbs./hr. to a water-cooled, vertical hydrochlorinator connected to the reaction vessel through an intervening vertical, packed column scrubber. The pyridine is introduced under the surface of a 5" deep pool of preformed pyridine dihydrochloride maintained on a sieve tray and through which the HCl/Cl₂ off gas from the reactor is bubbling. The resulting dihydrochloride overflow from the tray flows down through the scrubber column, which is filled with ceramic saddles. The descending pyridine dihydrochloride stream scrubs out any chloropyridines vaporized or entrained in the ascending off-gas, and passes into the reactor.

When the liquid phase in the reactor attains a volume of 70 gallons, the chlorine feed is increased to 13 lb./hr., the pyridine feed rate is cut back to about 4.5 lbs./hr. and periodic product removal (at about 6 hour intervals) is started. This is done by stopping the stirrer and shutting off all feeds, letting the heavy product phase settle for about ten minutes and draining it off at the bottom of the reactor. At "steady state" condition, the rate of trichloropyridine recycle feed is approximately equal to the averaged out rate of trichloropyridines removed in the product phase.

The content of chlorine in the off-gas from the reactor remains within the range of 2-7 mole percent at all times and is about 3 mole percent most of the time.

After 450 hours of operation, all feeds are discontinued, a final withdrawal of heavy product phase is made and the run is terminated. A total of 5600 lbs. of heavy product phase has been accumulated. The compositions of the remaining reactor contents (light phase) and the heavy composited product, as determined by distillation and VPC analyses are as follows:

| Component | Weight percent of light phase in reactor | Weight percent of heavy composited product phase |
|---|---|---|
| Pyridine | 12 | |
| 3-chloropyridine | 1 | |
| 3,5-dichloropyridine | 0.7 } Sum | |
| 2,3,5-trichloropyridine } Sum | 7 | 21 |
| 2,4,5-trichloropyridine | | |
| 2,3,4,5-tetrachloropyridine } Sum | 10 { | 62 |
| 2,3,5,6-tetrachloropyridine | | 8 |
| Pentachloropyridine | 0.3 | 9 |
| Dimer | 45 | |
| HCl | 24 | Trace |

Correcting for the difference between the net amount of trichloropyridine recycle fed and the total recovery of trichloropyridines in the final reactor contents and in the heavy phase product composite, the percent conversion of pyridine is calculated as 95% and the yields of the heavier ends are calculated to be as follows:

| Product component | Yield Based on pyridine converted | Yield Based on pyridine charged |
|---|---|---|
| 2,3,4,5-tetrachloropyridine | 72.1 | 68.4 |
| 2,3,5,6-tetrachloropyridine | 9.3 | 8.9 |
| Pentachloropyridine and dimer | 15.3 | 14.5 |

The process of the present invention produces useful polychlorinated aromatic N-heterocyclic product compositions high in the higher chlorinated compounds which may be employed without change or may be separated into major components for ultimate use in product compositions or as starting materials for the preparation of other desirable products. For example, the 2,3,4,5-tetrachloropyridine enriched product, the 2,3,5,6-tetrachloropyridine enriched product, the 2,3,5,6-tetrachloro-4-trichloromethylpyridine, enriched product or the 3,4,5-tetrachloro-2-(trichloromethyl)-pyridine enriched product may be diluted with inert adjuvants to obtain pesticidal treating compositions. In such use the product is mixed with dispersing agents and dispersed in water to obtain spray compositions which when applied to foliage of bean, pigweed and foxtail plants effect complete kills of said plants.

Alternatively, the 2,3,4,5-tetrachloropyridine enriched crude product may be distilled to recover 2,3,4,5-tetrachloropyridine which is useful as an antimicrobial for the control of a number of undesirable bacterial and fungal organisms such as *Staphylococcus aureus*, *Aspergillus terreus* and *Pullularia pullulans*. 2,3,4,5-tetrachloropyridine is also useful as an intermediate for the production of 2,3,5-trichloro-4-pyridinol. The latter pyridinol compound and its salts are materials more recently found to be of outstanding value for the regulation of the growth of plants and particularly for the control of the growth and the killing of undesirable plant species. In such use, the 2,3,4,5-tetrachloropyridine is hydrolyzed with sodium hydroxide in a reaction medium such as water or an inert organic solvent such as benzene.

3,4,5,6-tetrachloro - 2 - (trichloromethyl)pyridine enriched crude product may be distilled to recover 3,4,5,6-tetrachloro-2-(trichloromethyl)pyridine or 3,4,5-trichloro-2-(trichloromethyl)pyridine which may separately be employed in pesticidal compositions. The product mixture may also be distilled to recover the components which may be employed as intermediates in the preparation of other chemical compounds, such as, for example, aminochloropyridine compounds by heating the recovered component with liquid ammonia in a sealed vessel at temperatures of from about 70° to above 190° C. at autogeneous pressure. The resulting aminochloropyridine compounds may be employed for the control of insert pests such as housefly, cockroach, mites, aphids, etc. or for the eradication of weeds or weed seeds. In such applications, the aminochloropyridine compounds may be prepared with dispersing agents to form aqueous dispersions or dispersed on inert solids to form dust compositions to be applied to infested areas.

The crude products containing the polychlorinated lutidines or collidines can be used as such or may be distilled to recover specific polychlorinated products and used with or without dispersing agents for plant growth suppressors.

Certain of the products obtained by the process of the present invention are useful for the control of undesirable plants and weed seeds. Thus, in representative operations, aqueous compositions containing one of 2,3,5,6-tetrachloropyridine and pentachloropyridine give good controls of vegetation such as wild oats when applied at a dosage of 50 pounds per acre to soil planted therewith.

The polyhaloquinolines may be converted to their N-oxides which are useful as fruit fly repellants. Others of the polychlorinated heterocyclic nitrogen compounds are useful as nitrification inhibitors in soil.

A cursory and by no means exhaustive examination of the prior art shows numerous examples of knowledge of how to use products of the disclosed processes.

Burckhalter et al.: 70 J. Am. Chem. Soc., 1363–73 (1948). Polychloroquinolines, as for example tetrachloroquinolines are reacted with 4-acetamido-α-diethylamino-o-cresol to produce antimalarial agents.

U.S. Pat. 2,940,974, June 14, 1960. Trichloroquinolines reacted with alkylenediamines gave derivatives having hypotensive activity.

French Pat. 1,170,743, published Jan. 16, 1959. Polychloro-pyridines, -picolines and -quinolines are used as plant growth control agents.

U.S. Pat. 3,044,930, July 17, 1962. N-oxides, prepared by known methods from polychloropyridines and -quinolines, are employed to repel birds and rodents.

U.S. Pat. 2,679,453, May 25, 1954. A variety of trichloromethyl-substituted pyridines are employed to control the growth of vegetation.

South African Pat. 411/61, granted Oct. 11, 1961. A variety of chlorinated trichloromethyl pyridines are employed to inhibit the nitrification of ammonium nitrogen in soil.

Belgian Pat. 624,800, granted May 14, 1963. Polychloro-methylpyridines are shown to be useful as nitrification inhibitors in soil, as herbicides, as nematocides, as insecticides and as fungicides.

Belgian Pat. 502,840, granted Feb. 15, 1963. Polychloro-methylpyridines are reacted with ammonia or amines to produce 4-amino-polychloro-methylpyridines shown to be useful as herbicides and pesticides active against a variety of named pests.

Belgian Pat. 502,841, granted Feb. 15, 1963. Amino compounds of Belgian 502,840 are reacted with strong acid to produce corresponding amino-chloropicolinic acids having outstanding herbicidal activity.

What is claimed is:

1. In a process for chlorinating pyridine, a methyl-substituted pyridine or quinoline wherein a liquid composition of the pyridine, methyl-substituted pyridine or quinoline feed compound and hydrogen chloride is contacted with chlorine gas at a temperature of from about 80° C. to about 225° C. thereby to prepare polychlorinated pyridine, methyl-substituted pyridine or quinoline products, the improvement which comprises providing during the chlorinated step, a hydrogen chloride partial pressure of from about 30 p.s.i.g. up to the critical pressure of hydrogen chloride, said hydrogen chloride partial pressure being sufficient to maintain the molar proportions of hydrogen chloride:feed compound in said liquid composition of from 1.9:1 to about 10:1.

2. The process as defined in claim 1 wherein the feed compound is pyridine.

3. The process as defined in claim 1 wherein the feed compound is a methyl-substituted pyridine.

4. The process as defined in claim 3 wherein the methyl-substituted compound is α-picoline.

5. The process as defined in claim 3 wherein the methyl-substituted compound is gamma-picoline.

6. The process as defined in claim 3 wherein the methyl-substituted compound is 2,4-lutidine.

7. The process as defined in claim 4 wherein the methyl-substituted compound is 2,6-lutidine.

8. The process as defined in claim 4 wherein the methyl-substituted compound is 3,5-lutidine.

9. The process as defined in claim 4 wherein the methyl-substituted compound is 2,4,6-collidine.

10. The process of claim 2 wherein the feed compound is quinoline.

11. In a two stage process for chlorinating pyridine, a methyl-substituted pyridine or quinoline wherein in the first stage, a liquid pyridine, methyl-substituted pyridine or quinoline-hydrogen chloride feed composition is prepared by reacting the feed pyridine, methyl-substituted pyridine or quinoline compound with anhydrous hydrogen chloride at a temperature of from about 25° to about 200° C. followed by a second stage wherein the liquid pyridine, methyl-substituted or quinoline feed compound-hydrogen chloride composition is contacted with chlorine gas at a temperature of from about 80° to about 225° C. thereby to prepare polychlorinated pyridine, methyl-substituted pyridine or quinoline proucts, the improvement which comprises providing during the first and second stage, a hydrogen chloride partial pressure of from about 30 p.s.i.g. up to the critical pressure of hydrogen chloride, said hydrogen chloride partial pressure being sufficient to maintain the molar proportions of hydrogen chloride:feed compound in said liquid composition of from 1.9:1 to about 10:1.

References Cited
UNITED STATES PATENTS

| | | | |
|---|---|---|---|
| 3,420,833 | 1/1969 | Taplin | 260—283 R |
| 3,424,754 | 1/1969 | Taplin | 260—290 HL |
| 3,557,124 | 1/1971 | Stringham | 260—290 HL |
| 3,123,608 | 3/1964 | Mathes | 260—283 R |
| 3,256,167 | 6/1966 | Norton et al. | 260—290 HL |
| 3,378,559 | 4/1968 | Tarnow et al. | 260—283 R |
| 3,412,095 | 11/1968 | Clark | 260—290 |
| 3,426,035 | 2/1969 | Bremmer | 260—283 R |

DONALD G. DAUS, Primary Examiner

U.S. Cl. X.R.

260—290 HL, 297 R, 694, 999